April 24, 1962 K. GEBELE 3,030,862
BAYONET COUPLING FOR CAMERAS
Filed Oct. 19, 1959
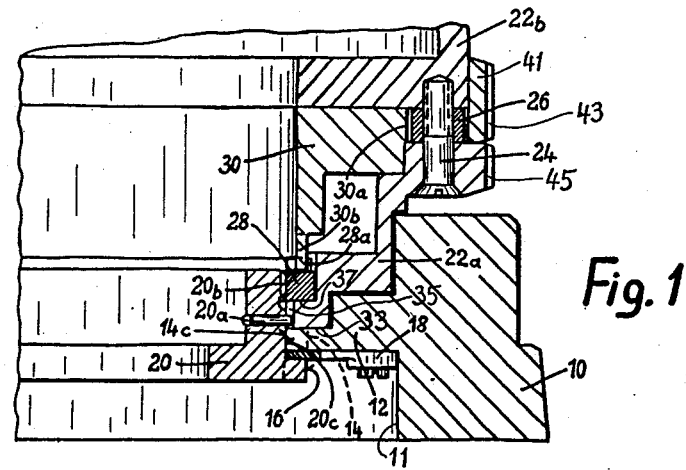
Fig. 1
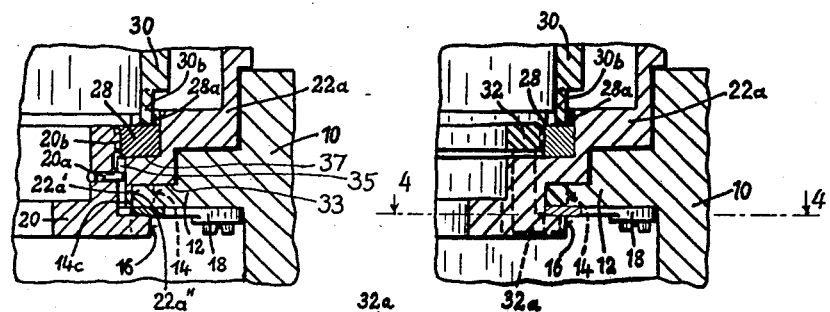
Fig. 2
Fig. 3
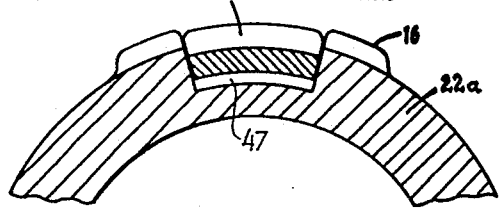
Fig. 4

United States Patent Office 3,030,862
Patented Apr. 24, 1962

3,030,862
BAYONET COUPLING FOR CAMERAS
Kurt Gebele, Munich, Germany, assignor to Compur-Werk Friedrich Deckel OHG, Munich, Germany, a firm of Germany
Filed Oct. 19, 1959, Ser. No. 847,180
Claims priority, application Germany Dec. 23, 1958
2 Claims. (Cl. 88—57)

The present invention relates to a bayonet coupling for detachably securing together two elements or units and, more particularly, to a bayonet coupling of the type especially useful in removably mounting interchangeable lens units on a camera housing.

With the continuing development of interchangeable lenses and shutters, there are appearing to an increasing extent interchangeable lenses having longer dimensions or greater weight, or both of these. When such larger or heavier interchangeable units are mounted on the camera, the greater torque acting on the bayonet coupling may not be adequately taken up, with the result that there may no longer be a firm mounting and an accurate alinement of the lenses on the optical axis.

An object of the invention is the provision of a generally improved and more satisfactory bayonet coupling capable of firmly detachably securing one relatively long and heavy unit to another larger unit.

Another object is to provide a new and improved bayonet coupling for detachably mounting an interchangeable lens unit on a camera body or housing.

Yet another object of the invention is the provision of a new and improved bayonet coupling between a camera housing and an interchangeable lens which assures firm connection even for relatively long and heavy interchangeable lenses.

A further object is to provide a new and improved bayonet coupling for a camera having a portion on the camera housing which is useful with other mating bayonet coupling portions of more standard design than that according to the invention.

These and other desirable objects may be attained in the manner disclosed as an illustrative embodiment of the invention in the following description and in the accompanying drawings forming a part hereof, in which:

FIG. 1 is a fragmentary axial section taken radially through a portion of an interchangeable lens shown mounted on a camera housing by a bayonet coupling according to a first embodiment of the invention, the camera housing likewise being partially shown in section;

FIG. 2 is a sectional view similar to FIG. 1 illustrating a bayonet coupling according to a second embodiment of the invention;

FIG. 3 is a sectional view similar to FIG. 1 illustrating still another bayonet coupling according to a third embodiment of the invention; and FIG. 4 is a fragmentary transverse section through the interchangeable lens taken approximately on the line 4—4 of FIG. 3.

The same reference numerals throughout the several views indicate the same parts.

In FIG. 1 is illustrated a front wall 10 of the camera body or housing of a still camera of the type commonly known as a miniature photographic camera, the camera being of any suitable internal construction as these details are not important to the present invention. Extending radially into a lens aperture 11 provided in the front wall 10 is a camera bayonet ring 12, the bayonet ring 12 either being integral with the front wall 10 as shown, or else provided on a separate bayonet connection plate suitably fastened to the front wall 10. The bayonet ring 12 desirably has an upper inner annular shoulder 33, and the reduced portion so formed is provided at its innermost circular edge with a plurality of circumferentially spaced bayonet recesses 14.

Insertable into the recesses 14 of the camera bayonet ring 12 is a mating bayonet coupling member including a corresponding number of circumferentially spaced wings 16 provided on a bayonet ring 20 carried by an interchangeable lens unit to be described in greater detail later, the wings 16 extending radially outwardly from the main body of the mount bayonet ring 20. In a well known fashion, the wings 16 are moved axially through the bayonet recesses 14, whereafter the bayonet ring 20 and the wings 16 are rotated so that the wings 16 and recesses 14 are no longer alined. Preferably three such bayonet wings 16 and recesses 14 are provided to mate together in the manner described. This common type of simple bayonet connection is similar to that illustrated in FIGS. 2, 3, and 4 of Patent No. 2,900,885 of K. Gebele, issued on August 25, 1959, wherein the wings 32 correspond to the wings 16 of the present invention, and the recesses in the bayonet plate 42 correspond to the recesses 14 in the camera bayonet ring 12.

In the present instance, a spring 18 is preferably provided between the bayonet coupling parts and is firmly secured to the under surface of the camera bayonet ring 12. Three such circumferentially spaced leaf springs 18 are provided, each having a radial fastening arm and a circumferentially extending portion which underlies the outstanding bayonet lugs on the ring 12 between the recesses 14. The circumferentially extending portion, here shown in section, is bowed in an axial direction, so that as the wings 16 are inserted through the recesses 14 and then rotated, the wings 16 slide over the circumferentially extending portion of the springs 18 to compress and flatten out the springs to the extent necessary to secure a firm connection with little free play between the two bayonet rings 12 and 20. At the end of the rotational movement of the wings 16, a conventional locking device is provided between the two bayonet rings 12 and 20 to lock them in a final connected position. The locking device may take the form of a disengageable locking bolt of known type, not here shown, which automatically drops into a locking notch of the interchangeable lens. The locking device may also be of the type shown in the copending patent application No. 607,218 of K. Gebele, filed August 30, 1956 (now Patent 2,926,581, granted March 1, 1960), or that shown in German Patent No. 935,882, or that shown in French Patent No. 1,064,773. The exact structure of the locking device is unimportant to the present invention except that it acts to lock the bayonet coupling at the end of the rotational movement of the wings 16.

In the simple bayonet coupling described, the springs 18 are compressed to the extent necessary to secure a firm engagement without substantial free play between the two bayonet rings 12 and 20. The interchangeable lens normally extends out in cantilever fashion on the front of the camera body. Where the interchangeable lens is of small size and weight, the springs 18 are sufficiently strong to withstand the tipping moment or torque acting on the interchangeable lens coupling. Such an interchangeable lens may be called a standard interchangeable lens. With an interchangeable lens of larger size or weight, or a combination of these, which may be called a special interchangeable lens, the increased bending moment or increased tendency to tip may actually result in some tipping because the springs of the bayonet coupling are not strong enough to draw the interchangeable unit tightly to its fully seated position, so that there is no longer a firm engagement and the optical axis of the lens elements in the interchangeable lens unit may no longer be exactly in line with the optical axis of the camera body.

In accordance with the invention, the bayonet ring 20 is displaceable axially with respect to the lens mount in order to draw the lens mount seating surface tightly and uniformly against the mating seating surface of the camera. Various surfaces of the lens mount and the camera could be chosen as the mating seating surfaces, but in the form here shown the flat annular rear face of the part 22a, lying in a plane perpendicular to the optical axis of the interchangeable lens unit, is the seating surface of the interchangeable lens unit, and it mates with and seats tightly against a flat annular face 33 (in a plane perpendicular to the optical axis of the camera) on the front of the rearmost step of the inwardly extending bayonet flange 12 of the camera part 10. Both the interchangeable mount and the camera have other stepped surfaces (some cylindrical, and some annular) forwardly of the mating or seating surfaces above mentioned. These other stepped surfaces are approximately in contact with each other, but it will be seen from the drawings that these other stepped surfaces are not in tight engagement but have some looseness or play between them. Thus manufacture is facilitated, because these other stepped surfaces can be machined to a greater tolerance, and only the above-mentioned mating or seating surfaces need be machined very accurately to a close tolerance. When these mating surfaces are drawn into tight seating engagement with each other (as can be done easily by the present invention, even when the interchangeable lens unit is unusually long or heavy) then it is assured that the optical axis of the interchangeable unit is accurately alined with the optical axis of the camera, at least in a directional sense (i.e., in the sense that one axis does not tilt relative to the other). Accurate alinement in the sense of absence of any lateral displacement of one axis relative to the other can be assured by other mating surfaces of high precision, as further mentioned below.

The lens mount or unit comprises two parts 22a and 22b, both annular in form and fastened together axially spaced from one another as by means of a plurality of circumferentially spaced cylindrical bushings 26, through each of which extends a screw 24. The rear lens mount part 22a has various steps as above mentioned, which fit loosely or with play approximately against corresponding steps of the camera part 10. To secure the bayonet ring 20 to the lens mount part 22a for rotation therewith while being axially displaceable with respect thereto, a radially extending lock pin 20a is fastened to the bayonet ring 20 and extends into an axial groove 35 in the innermost portion of the lens mount part 22a. The bayonet ring 20 is externally threaded at its forward end at 20b. These threads engage internal threads on a coupling ring 28 the rear face of which is rotatably supported on an internal annular shoulder 37 of the lens mount part 22a. It may be seen that rotation of the coupling ring 28 moves the bayonet ring 20 and the wings 16 in an axial direction.

Between the two lens mount parts 22a and 22b is rotatably mounted a generally Z-shaped clamping ring 30. The central radially extending portion of the clamping ring 30 is held against axial movement by contact with the parts 22a and 22b. A plurality of arcuate cut-outs 30a are provided in the clamping ring 30, through which cut-outs the spacing bushings 26 and the fastening screws 24 extend. An inner annular flange of the clamping ring 30 extends rearwardly and is formed at its end with one or more driver elements in the form of driver dogs 30b engaged in one or more driver slots 28a provided in the front face of the threaded ring 28. By this arrangement, the threaded ring 28 is coupled with the clamping ring 30 for rotation therewith. The outer leg of the clamping ring 30 extends forwardly to provide a marginal flange 41 which partially overlaps and extends circumferentially around the rear portion of the periphery of the lens mount part 22b. The clamping ring flange 41 and the lens mount part 22a have circumferentially extending gripping edges or rims of substantially the same diameter, as seen in FIG. 1, these rims being knurled at 43 and 45, respectively, for easy non-slipping grasping by the fingers of the operator.

In the embodiment of FIG. 1, the centering of the interchangeable lens unit with respect to the optical axis of the camera extending centrally through the lens aperture 11 is effected by the external cylindrical peripheral surface 20c of the bayonet ring 20, which fits snugly both in the cylindrical inner surface 14c of the camera bayonet ring 14, and in the cylindrical inner surface of the mount part 22a. Assurance is thereby obtained that the optical axis of the lenses in the interchangeable lens unit is alined with the optical axis of the camera, without any lateral offset of one relative to the other.

In the operation of the embodiment of FIG. 1, the interchangeable lens unit is introduced axially into the bayonet ring 12 on the camera front wall 10 with the wings 16 of the mount bayonet ring 20 alined with the bayonet recesses 14 of the camera ring 12. The interchangeable lens unit is grasped manually in the normal manner with the tips of the fingers engaged with the knurlings 45 of the lens mount part 22a, other portions of the fingers simultaneously overlying and resting upon the knurlings 43 of the clamping ring 30. After moving axially through the bayonet recesses 14, the interchangeable lens unit is rotated as a single piece so that the wings 16 become offset from the recesses 14 and become engaged under the bayonet wings on the camera. The rotation continues until the aforementioned locking device (if one is present) is actuated to secure the interchangeable lens unit to the camera in a particular angular position, or until contact with the usual stop pin indicates that the limit of rotation has been reached. During this rotation, the wings 16 engage the springs 18 secured to the inner surface of the camera bayonet ring 12 to compress these springs 18 to a small extent to take up the free play between the interengaging bayonet parts.

This spring action may be sufficient to seat the mating seating surfaces of the mount and the camera tightly against each other, in the case of a "standard" interchangeable lens unit of comparatively light weight. But when mounting a "special" unit which is relatively long or heavy or both, the operator continues to rotate or twist the knurlings 43 of the clamping ring 30 after the bayonet ring 20 and the lens mount part 22a have come to their limit of rotation. As the clamping ring 30 rotates, the driver dog 30b carried thereby, engaging in the slot 28a of the threaded ring 28, causes the threaded ring 28 to rotate by a corresponding amount on the shoulder 37 of the lens mount part 22a. By means of the threads 20b between the threaded ring 28 and the bayonet ring 20, the ring 20 is drawn forwardly to clamp the wings 16 more tightly against the rear surface of the camera bayonet ring 12, or rather against the interposed springs 18. This clamping action can be continued if necessary until the leaf springs 18 are completely flattened out and there is a solid non-resilient engagement of the parts, thereby assuring firm and complete engagement of the above mentioned seating surfaces no matter how heavy the interchangeable unit may be, without relying on any spring action to keep it in place.

The direction of rotation of the clamping ring 30 for the actuation of the additional clamping action is the same as the direction of the twisting movement of the lens mount part 22a for initially engaging the bayonet coupling. Accordingly, the operator can grip both knurlings 43 and 45 simultaneously, twist the interchangeable lens unit into position on the camera bayonet ring 12 and thereupon, without having to remove his fingers, further rotate the clamping ring 30 alone in the twisting-in direction to effect the clamping fast of the interchangeable lens. The changing of the lens can thus be effected in entirely as simple a manner as in the case of standard lenses provided with a normal bayonet coupling despite the additional clamping device provided in the case of the present invention. The removal of the interchangeable lens is as simple, the fingers slipping over the knurlings 45 on the lens mount part 22a until movement of the wings 16 relative to the springs 18 and ring 12 may occur.

In FIG. 2 is illustrated a second embodiment of the invention, identical elements in this embodiment having been given the same numerals as in FIG. 1, and no additional description of these elements is thought to be necessary. In this construction, the centering of the optical axis of the interchangeable lens unit with the optical axis of the camera is provided directly between the lens mount part 22a and the camera bayonet part 12. For this purpose, the lens mount part 22a has a rearward projection 22a′, the cylindrical outer surface 22a″ of which is centered in the inner surface 14c of the bayonet ring 12. The mount bayonet ring 20 is different from the mount bayonet ring 20 of the embodiment of FIG. 1 only in that it is undercut to a greater extent in its central peripheral surface to provide a clearance for the projection 22a′. The clearance of the fit between the ring 20 and the lens mount part 22a thus in no way imperils the centering of the interchangeable lens unit. The operation of this embodiment is the same as that of the operation of the embodiment of FIG. 1 and need not be further explained.

In FIGS. 3 and 4 is shown still another or third embodiment. Corresponding elements as in FIGS. 1 and 2 have been given identical numerals, and no further description of these elements is thought to be necessary. In this construction, instead of having the entire bayonet ring of the interchangeable unit movable axially, only some portions thereof, at circumferentially spaced intervals, are movable axially to effect firm clamping. The portions 16 of the bayonet wings on the mount are now formed integrally with the lens mount part 22a. In place of the ring 20, a clamping sleeve 32 is threaded to the threaded ring 28 so as to be axially displaceable when the clamping ring 30 is rotated relative to the lens mount part 22a.

The clamping sleeve 32 is provided with a plurality of circumferentially spaced rearwardly extending clamping jaws 32a having radially outwardly turned ends which are engageable with the springs 18. As shown in FIG. 4, each clamping jaw 32a extends through an axial clearance recess 47 in the lens mount part 22a and the wings 16 secured thereto, the outturned ends of these clamping jaws thus becoming movable portions of the bayonet wings. The clamping jaws 32a, of course, are displaceable axially with respect to the lens mount part 22a, but rotate with the lens mount part 22a during the initial insertion of the interchangeable lens unit.

The operation of the embodiment of FIGS. 3 and 4 is similar to that of the embodiment of FIGS. 1 and 2. In this case, the clamping ring 30, when additionally rotated relative to the locked lens mount part 22a, in the same manner as before rotates the threaded ring 28 by a corresponding amount to displace the clamping sleeve 32 and the attached clamping jaws 32a in an axial direction. The clamping jaws 32a are thus drawn forwardly to engage more firmly the springs 18 and ring 12 and thereby secure a firmer clamping engagement for the removable interchangeable lens.

As a variation of the embodiment of FIGS. 3 and 4, the clamping jaws 32a may be provided individually and brought directly into engagement with the threaded ring 28, thus eliminating the connecting portions of the clamping sleeve 32.

By the invention, a stronger bayonet coupling is achieved between a special interchangeable lens unit and the camera on which the lens unit is removably mounted. The stronger coupling assures that any tendency to tilt due to the heavy weight of the special interchangeable lens is avoided. The changing of the lens unit is accomplished as simply as when changing standard lens units provided with a common bayonet coupling despite the additional clamping action provided by the present invention. The operator may effect the additional clamping fast of the wings 16, or at least a portion thereof as in the case of the embodiment of FIGS. 3 and 4, by a continuation of the same twisting movement used to initially insert the interchangeable lens unit. A further unique advantage of the invention is that the camera bayonet coupling parts, i.e., the ring 12 and springs 18, remain unchanged so that standard interchangeable lenses may be mounted on the same camera adapted to receive the special interchangeable lens unit provided with the additional clamping action as herein described.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a bayonet coupling between a camera body member and an interchangeable lens unit, said camera body member being a front wall having a lens aperture and a camera bayonet ring extending radially into said lens aperture, said camera bayonet ring having a plurality of circumferentially spaced bayonet recesses and a plurality of leaf spring elements fastened to the undersurface of said bayonet ring between said recesses, said interchangeable lens unit including a lens mount, a matting bayonet coupling member carried by said lens mount and including a plurality of circumferentially spaced bayonet wings inserted through said camera bayonet recesses and thereafter rotated to ride over and compress said leaf spring elements, means mounting at least a portion of said wings for axial movement relative to said lens mount and for holding said wings against rotary movement relative to said mount, said lens mount overlying said camera bayonet ring, the improvement comprising a clamping ring mounted on said lens mount for rotation with respect thereto, a threaded ring rotatably mounted on said lens mount and in driving engagement with said clamping ring, and means actuated in response to rotation of said threaded and clamping rings for axially displacing at least a portion of said bayonet wings in the direction of said camera bayonet ring, to thereby additionally compress said leaf spring elements and tighten the engagement of said lens mount and bayonet wings on said camera bayonet ring to more firmly secure said interchangeable lens unit to said camera body.

2. The combination defined in claim 1, wherein said lens mount and clamping ring each has a peripheral gripping edge of the same diameter lying adjacent one another, the direction of rotation of said lens mount in engaging said bayonet wings with said camera bayonet ring being the same as the direction of rotation of said clamping ring with respect, thereto, whereby the same twisting movement in inserting the interchangeable lens unit subsequently actuates the clamping ring.

References Cited in the file of this patent

UNITED STATES PATENTS

| 2,649,024 | Goldhamer | Aug. 18, 1953 |
| 2,826,118 | Suzukawa | Mar. 11, 1958 |
| 2,908,209 | Marvin | Oct. 13, 1959 |